(12) United States Patent
Srinivasan

(10) Patent No.: US 9,664,512 B2
(45) Date of Patent: May 30, 2017

(54) ORIENTATION INDICATION DEVICE

(71) Applicant: Tilak Srinivasan, Bangalore (IN)

(72) Inventor: Tilak Srinivasan, Bangalore (IN)

( * ) Notice: Subject to any disclaimer, the term of this patent is extended or adjusted under 35 U.S.C. 154(b) by 186 days.

(21) Appl. No.: 14/407,262

(22) PCT Filed: May 20, 2014

(86) PCT No.: PCT/IB2014/061549
§ 371 (c)(1),
(2) Date: Dec. 11, 2014

(87) PCT Pub. No.: WO2015/097569
PCT Pub. Date: Jul. 2, 2015

(65) Prior Publication Data
US 2015/0338215 A1    Nov. 26, 2015

(30) Foreign Application Priority Data
Dec. 23, 2013 (IN) .......................... 6015/CHE/2013

(51) Int. Cl.
*G01C 9/10* (2006.01)
*G01B 5/24* (2006.01)
*G06F 3/0346* (2013.01)

(52) U.S. Cl.
CPC ............... *G01C 9/10* (2013.01); *G01B 5/24* (2013.01); *G06F 3/0346* (2013.01)

(58) Field of Classification Search
CPC ............ G01C 9/10; G01B 5/24; G06F 3/0346
USPC .................................. 33/365, 374, 501, 1 SA
See application file for complete search history.

(56) References Cited

U.S. PATENT DOCUMENTS

| 765,145 | A | * | 7/1904 | Manahan | A63B 37/0097 473/351 |
| 1,120,757 | A | * | 12/1914 | Berger | 473/594 |
| 2,393,473 | A | * | 1/1946 | Jones | G01C 21/16 250/215 |
| 2,940,318 | A |  | 6/1960 | Adams et al. | |
| 3,106,397 | A | * | 10/1963 | Lacey | A63B 43/04 446/409 |
| 3,128,562 | A | * | 4/1964 | Yusa | G01C 17/00 33/364 |
| 3,267,747 | A |  | 8/1966 | Paine | |
| 3,872,469 | A | * | 3/1975 | Loughran, Jr. | G08B 5/24 340/815.63 |
| 4,179,818 | A | * | 12/1979 | Craig | G01C 21/16 33/321 |

(Continued)

OTHER PUBLICATIONS

Oct. 30, 2014 International Search Report issued in International Application No. PCT/IB2014/061549.

(Continued)

*Primary Examiner* — R. A. Smith
*Assistant Examiner* — Tania Courson
(74) *Attorney, Agent, or Firm* — Oliff PLC

(57) ABSTRACT

An orientation indicating device, the device comprises an enclosure, a plurality of rods fixed together at their one end forming a rod structure. The rod structure is rotatably mounted inside the enclosure. At least one roller provisioned in-between an inner surface of the enclosure and a free end of each of the plurality of rods. Further, at least one rod of the plurality of rods is configured to be heavier than the other rods, and said heavier rod is adapted to point towards gravity.

19 Claims, 11 Drawing Sheets

(56) References Cited

U.S. PATENT DOCUMENTS

| | | | | |
|---|---|---|---|---|
| 4,194,737 A * | 3/1980 | Farmer | A63H 33/005 | 446/135 |
| 4,477,188 A * | 10/1984 | Stiles | G01C 19/668 | 356/471 |
| 4,501,569 A * | 2/1985 | Clark, Jr. | A63H 33/005 | 180/21 |
| 4,511,345 A * | 4/1985 | Winkler | F16D 3/2245 | 464/111 |
| 4,513,509 A * | 4/1985 | Nordstrom | G01C 23/005 | 33/328 |
| 4,601,675 A * | 7/1986 | Robinson | A63H 33/005 | 446/449 |
| 4,712,094 A * | 12/1987 | Bolson, Sr. | G01V 15/00 | 324/329 |
| 4,825,716 A * | 5/1989 | Roberts | B64G 1/286 | 74/5.34 |
| 4,886,364 A * | 12/1989 | Ljung | G01C 19/665 | 356/468 |
| 4,919,300 A * | 4/1990 | Anderson | B65D 81/00 | 206/521 |
| 4,962,591 A * | 10/1990 | Zeller | G01B 21/042 | 33/502 |
| 5,365,671 A | 11/1994 | Yaniger | | |
| 5,533,921 A * | 7/1996 | Wilkinson | A63H 33/005 | 446/409 |
| 5,964,639 A * | 10/1999 | Maxim | A63B 43/00 | 434/302 |
| 6,123,599 A * | 9/2000 | Chiang | A63H 5/00 | 446/196 |
| 6,275,213 B1 * | 8/2001 | Tremblay | G06F 3/011 | 345/156 |
| 6,380,857 B1 * | 4/2002 | Galloway | F16L 1/11 | 340/572.5 |
| 6,718,280 B2 * | 4/2004 | Hermann | G01C 21/16 | 702/153 |
| 6,855,028 B2 * | 2/2005 | Siegel | A63B 43/04 | 446/456 |
| 6,937,125 B1 * | 8/2005 | French | F16C 39/063 | 335/296 |
| 6,991,561 B2 * | 1/2006 | Nesbitt | A63B 21/0004 | 473/355 |
| 7,258,591 B2 | 8/2007 | Xu et al. | | |
| D582,998 S * | 12/2008 | Chernick | D21/398 | |
| 7,520,830 B2 * | 4/2009 | Wong | A63B 43/04 | 473/594 |
| 7,963,351 B2 * | 6/2011 | Troy | B62D 57/00 | 180/8.1 |
| 8,002,652 B2 * | 8/2011 | Wong | A63B 43/04 | 473/594 |
| 8,210,289 B1 * | 7/2012 | Lu | B62D 57/02 | 180/10 |
| 8,467,925 B2 * | 6/2013 | Troy | B62D 57/00 | 180/7.1 |
| 9,080,900 B2 * | 7/2015 | Ridgway | G01D 13/22 | |
| 9,142,104 B2 * | 9/2015 | Nakamura | G06F 3/016 | |
| 2005/0049092 A1 * | 3/2005 | Lo | A63B 43/04 | 473/594 |

OTHER PUBLICATIONS

Oct. 30, 2014 Written Opinion issued in International Application No. PCT/IB2014/061549.

* cited by examiner

ORIENTATION INDICATION DEVICE

CROSS-REFERENCE TO RELATED APPLICATIONS

This application claims priority from India Patent Application Serial No. 6015/CHE/2013 filed 23 Dec. 2013 entitled "ORIENTATION INDICATION DEVICE", the contents of which are incorporated herein in their entirety.

TECHNICAL FIELD

The present disclosure generally relates to an indication device. Embodiments of the disclosure disclose an orientation indication device for determining the orientation about the pitch, roll and yaw axes of an object.

BACKGROUND OF THE DISCLOSURE

Orientation of a rigid body is generally calculated by using Euler angles, which was first introduced by Leonhard Euler. In order to describe a particular orientation/position of a rigid body in 3-dimensional medium parameters along the X-axis, Y-axis and Z-axis are required.

By using these parameters or elemental rotations, any orientation of the object may be determined. The elemental rotations can either occur about the axes of the fixed co-ordinate system, which is initially aligned with the fixed one, and the same modification of the orientation occurs after each elemental rotation. These kinds of rotations are also called as intrinsic rotations. These imaginary rotating co-ordinate systems may be imagined to be rigidly attached to a rigid body. There is also a possibility of two different rotation axes such as intrinsic and extrinsic.

Conventionally, Euler angles were used to represent both the position and orientation of the rigid body. A local co-ordinate system having axes denoted by x, y and z which constitute the axes of frame, and another co-ordinate system X, Y and Z which constitute the axes of the rotated frame. By using these co-ordinates both position and orientation of the rigid body can be determined wherein, the reference orientation can be imagined to be a first orientation from which the frame virtually rotates to reach its actual orientation.

Many devices such as but not limiting to gyroscopes, gimbal etc., are used in applications such as but not limiting to vehicles and aircrafts to determine the pitch, roll and yaw axes. This plays a role in orienting and positioning the vehicle/aircraft and also aids in maneuverability. A gyroscope works on the principle of angular momentum which basically is the amount of rotation that an object may have, taking into account of mass and shape of the object. In simple words it is the vector quantity that represents the product of a body's rotational inertia and rotational velocity about a particular axis.

Gyroscopes are of different types based on the different operating principles on which they adapt to. Generally, gyroscopes such as the electronic, microchip-packaged MEMS gyroscope devices found in consumer electronic devices, solid-state ring lasers, fibre optic gyroscopes, and the extremely sensitive quantum gyroscope are known in the art. Their applications range from a variety of devices such as electronic gadgets to vehicles such as cars, ships and aircrafts.

One of the major disadvantage of the gyroscope is its pan and tilt rotation speed. When the gyro is subjected to tilt and pan above the prescribed limit, the gyro fails to determine the orientation, this is seen in many of the electronic gadgets. However, not all gyros and gimbal's employed in electronic devices and vehicles have aforesaid disadvantages and ones which don't have these flaws are very expensive to manufacture. Secondly, the gyroscopes and gimbals have complex result obtaining techniques, and as already mentioned are very expensive to manufacture.

In light of foregoing discussion, there is a need to develop an orientation indicating device which can determine the orientation of an object about pitch, roll and yaw axes, to overcome the limitations stated above.

SUMMARY OF THE DISCLOSURE

The shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

In one non-limiting embodiment of the present disclosure there is provided an orientation indicating device. The device comprises an enclosure, a plurality of rods fixed together at their one end forming a rod structure. The rod structure is rotatably mounted inside the enclosure. At least one roller provisioned in-between an inner surface of the enclosure and a free end of each of the plurality of rods. Further, at least one rod of the plurality of rods is configured to be heavier than the other rods, and said heavier rod is adapted to point towards gravity.

In an embodiment of the present disclosure, the center of the each roller is equidistant from the center of the rod structure.

In an embodiment of the present disclosure, shape of the rollers and the enclosure is spherical.

In an embodiment of the present disclosure, the enclosure is translucent.

In an embodiment of the present disclosure, the heavier rod is visually differentiable from the other rods of the rod structure.

In an embodiment of the present disclosure, the at least one roller is at least one of ball bearings, roller bearings, journal bearings, plain bearings, acrylic bearings, Polyvinyl chloride (PVC) bearings, synthetic material bearings and the like.

It is to be understood that the aspects and embodiments of the invention described above may be used in any combination with each other. Several of the aspects and embodiments may be combined together to form a further embodiment of the disclosure.

The foregoing summary is illustrative only and is not intended to be in any way limiting. In addition to the illustrative aspects and features described above, further aspects, and features will become apparent by reference to the drawings and the following detailed description.

BRIEF DESCRIPTION OF THE ACCOMPANYING DRAWINGS

The novel features and characteristic of the disclosure are set forth in the appended description. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which.

Figure 1:
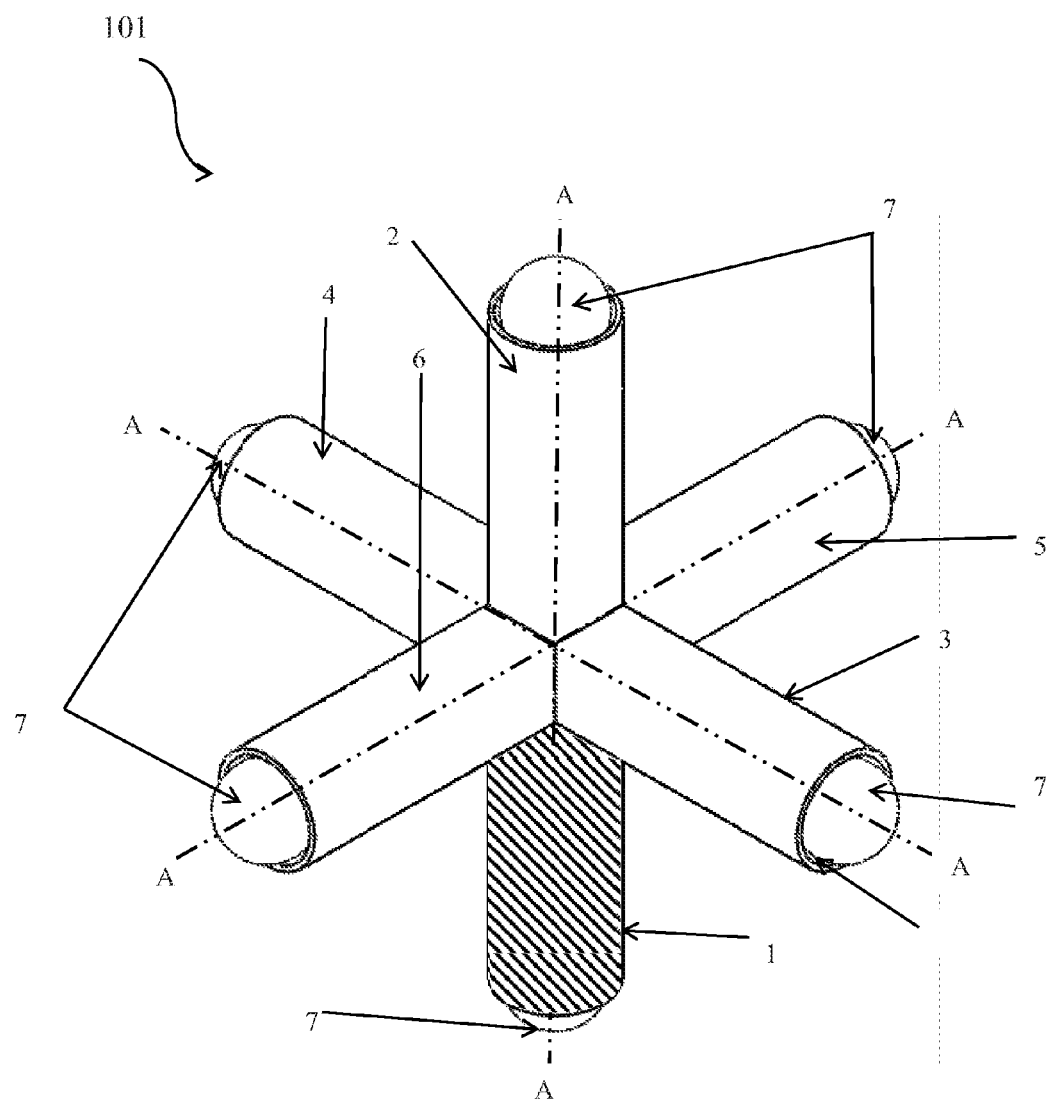
FIG. 1 illustrates perspective view of the rod structure of the orientation indicating device in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DESCRIPTION OF THE DISCLOSURE

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Henceforth, embodiments of the present disclosure are explained with the help of exemplary diagrams and one or more examples. However, such exemplary diagrams and examples are provided for the illustration purpose for better understanding of the present disclosure and should not be construed as limitation on scope of the present disclosure.

To overcome some of the limitations stated in the background, the present disclosure provides an orientation indicating device. The orientation indicating device may also termed as Structure Based Orientation Indication Device (SBOID) is used for determining the orientation of an object about three mutually perpendicular axes. The three mutually perpendicular axes being pitch, roll and yaw axes or X, Y and Z axis of an object. The orientation indicating device in the present disclosure is constructed in such a way that it determines the orientation of the platform to which the orientation indicating device is fixed onto.

The orientation Indicating device consists of a rod structure having plurality of rods fixed/fused together at their one end. In an embodiment, the plurality of rods is of equal length, and is fused at their one end which gives rise to a rod structure. Further, free end herein after interchangeably referred as tip end of each of the rods may be provided with a provision of hemi-spherical shape. The device further comprises an enclosure of spherical shape for enclosing the rod structure. In an embodiment, the rollers are positioned partially in and partially out of the provisions. The rollers are also placed such that the center of each roller is equidistant from the center of the rod structure. In the orientation device, one of the rods out of the plurality of rods is configured to be heavier than the other rods. As an example, the heavier rod is manufactured such that, the amount of material used is greater in volume than that of the volume of material used in manufacturing other rods, thus making the heavier arm orient itself towards gravity during operation. The other rods of the rod structure apart from the heavier rod are manufactured such that, they are proportional in their weight and shape. This avoids imbalance forces when the orientation indication device is in operation. The rod structure placed inside the enclosure is free to rotate inside the enclosure due to the action of various forces on the enclosure. The entire enclosure with the rod structure constitutes the orientation indicating device. This orientation indicating device is fixed onto any platform for determining the orientation of the object about three mutually perpendicular axes i.e. pitch, roll and yaw axes respectively.

In the following description the words such as small and above are used with respect to particular orientation of the figures as depicted in the present disclosure. The words are used to explain the aspects of the present disclosure and for better understanding, however the same is not a limitation to the present disclosure.

Referring now to the drawings wherein the drawings are for the purpose of illustrating an exemplary embodiment of the disclosure only, and not for the purpose of limiting the same. In the foregoing explanation and the figures of the disclosure, the orientation indication device is explained with rod structure having six numbers of rods for the purpose of explanation only. However, one skilled in the art can envisage using any number of rods more than four for configuring the orientation indication device.

FIG. 1 is an exemplary embodiment of the present disclosure which illustrates perspective view of the rod structure (101) of the orientation indicating device (100). The rod structure (101) consists of plurality of rods (1, 2, 3, 4, 5 and 6) fused at their one ends such that each of the plurality of rods forms a substantially perpendicular joint with the subsequent rods, and is substantially parallel to the rod which is in same axis (A_A). Further, at least one rod (1) out of the plurality of rods (1, 2, 3, 4, 5 and 6) is configured to be heavier than the other rods (2, 3, 4, 5, and 6). The heavier rod (1) (for the purpose of illustration is hatched as shown in FIG. 1) pointing towards gravity with respect to the other rods (2, 3, 4, 5, 6). The heavier rod is manufactured such that, the amount of material used is greater in volume than that of the volume of material used in manufacturing other rods, thus making the heavier arm orient itself towards gravity during operation. All of the rods (1, 2, 3, 4, 5 and 6) are of equal lengths (L) from the tip end to the center of the rod structure (101). The rods (1, 2, 3, 4, 5 and 6) have to be equal in length (L), otherwise there would be imbalance forces acting on the rod structure (101) due to eccentricity developed at the center of gravity on the rod structure (101). Further, each of the plurality of rods (1, 2, 3, 4, 5 and 6) are configured in a shape including but not limiting to circular, square, rectangular, triangular, trapezoidal, octagonal, or any other shape which is generally known in the art. In an embodiment, the dimension of the plurality of rods (1, 2, 3, 4, 5 and 6) is equal. In an exemplary embodiment of the present disclosure, the plurality of rods are circular in shape and are having diameter (D) which are consistent with each of the plurality of rods (1, 2, 3, 4, 5 and 6). The plurality of rods (1, 2, 3, 4, 5 and 6) are fused at their respective one ends in such a way that, the at least two rods are parallel to at least one axis. As best shown in FIG. 1, the rods (1, 2) are parallel to X-axis, the rods (3, 4) are parallel to Y-axis, and the rods (5, 6) are parallel to the Z-axis. All the rods (1, 2, 3, 4, 5 and 6) are fused in such a way that, ends of each rod are joined so as to form a star shaped structure with each of the rods pointing along X, Y and Z axes. In an embodiment, the rod (1) is built in such a way that, the weight of the rod (1) is heavier than that of the other rods (2, 3, 4, 5 and 6). The heavier rod (1) for the purpose of illustration is hatched as shown in FIG. 1. In the device, the heavier rod (1) may be provided with different color when compared to the other rods to facilitate visual indication. By providing a heavier rod (1) in the rod structure, the center of gravity of the rod structure (101) will be always acting at the tip end of the heavier rod (1). In an embodiment of the present disclosure, the rod (1) is configured as the heavier rod by using a material which is heavier than the material used for other rods. Some of the materials that are used in the rods are at least one of Aluminium-Magnesium-Silicon alloys, Aluminium-Zinc-Magnesium-Copper alloys, ES1 Stainless steel, Aluminium alloy—7075 T6/T651 and the like.

Further, each of the plurality of rods (1, 2, 3, 4, 5 and 6) is provided with a provision of hemi-spherical shape at their free ends. The provisions (12) are provided to accommodate at least one roller (7) for movement of the rod structure (101) within the enclosure (8) best shown in FIG. 2. The rollers (7) are generally configured in spherical shape, and are placed in such a way that, a portion of the roller (7) resides in a provision, and the remaining portion of the roller (7) is protrudes outside each of the rods (1, 2, 3, 4, 5 and 6). The rollers (7) are disposed in the provisions such that the rollers (7) are free to rotate in any direction with respect to the force applied on the orientation indicating device (100). The rollers (7) are basically friction rollers which rotate according to the direction of force applied on the orientation indicating device (100). In an embodiment, the rollers (7) are selected from a group comprising but are not limited to, ball bearings, roller bearings, specialized bearings and the like. Further, the diameter (R) of the roller (7) can be smaller or larger than the diameter of the provision (12). In addition, the rollers (7) are placed in the provisions (12) such that the center of each roller (7) is equidistant from the center of the rod structure (101).

Figure 2:
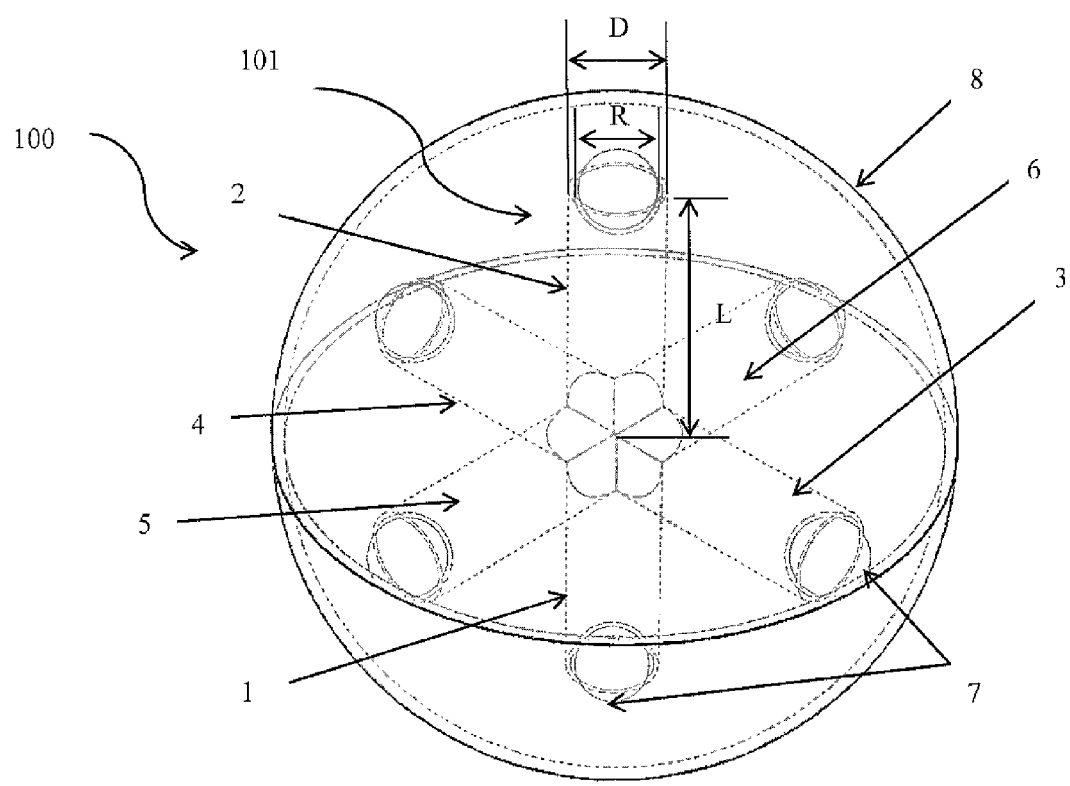
FIG. 2 illustrates perspective view of the orientation indicating device depicting rod structure of FIG. 1 configured inside an enclosure in accordance with an embodiment of the present disclosure.

FIG. 2 illustrates perspective view of the orientation indicating device (100) depicting the rod structure (101) configured inside an enclosure. The rod structure (101) having rods (1, 2, 3, 4, 5 and 6) are fused at their one end to form a star shaped structure with each of the rods (1, 2, 3, 4, 5 and 6) pointing at X, Y and Z axes both in positive and negative co-ordinates. The heavier rod (1) of the rod structure (101) always points towards gravity when the force is applied to the orientation indicating device (100). Further, at tip end of each of the rods (1, 2, 3, 4, 5 and 6) the roller is provided. The rod structure (101) will be enclosed in an enclosure (8) and can freely rotate within the enclosure (8) due to the any force acting on the orientation indicating device (100).

In an embodiment of the present disclosure, the inner diameter of the enclosure (8) is configured such that the rod structure (101) installed within the enclosure (8) rotates and orients itself with the help of rollers (7). The rollers (7) are in friction contact with the inner surface of the enclosure (8) and rotate without any slippage.

Figure 3:
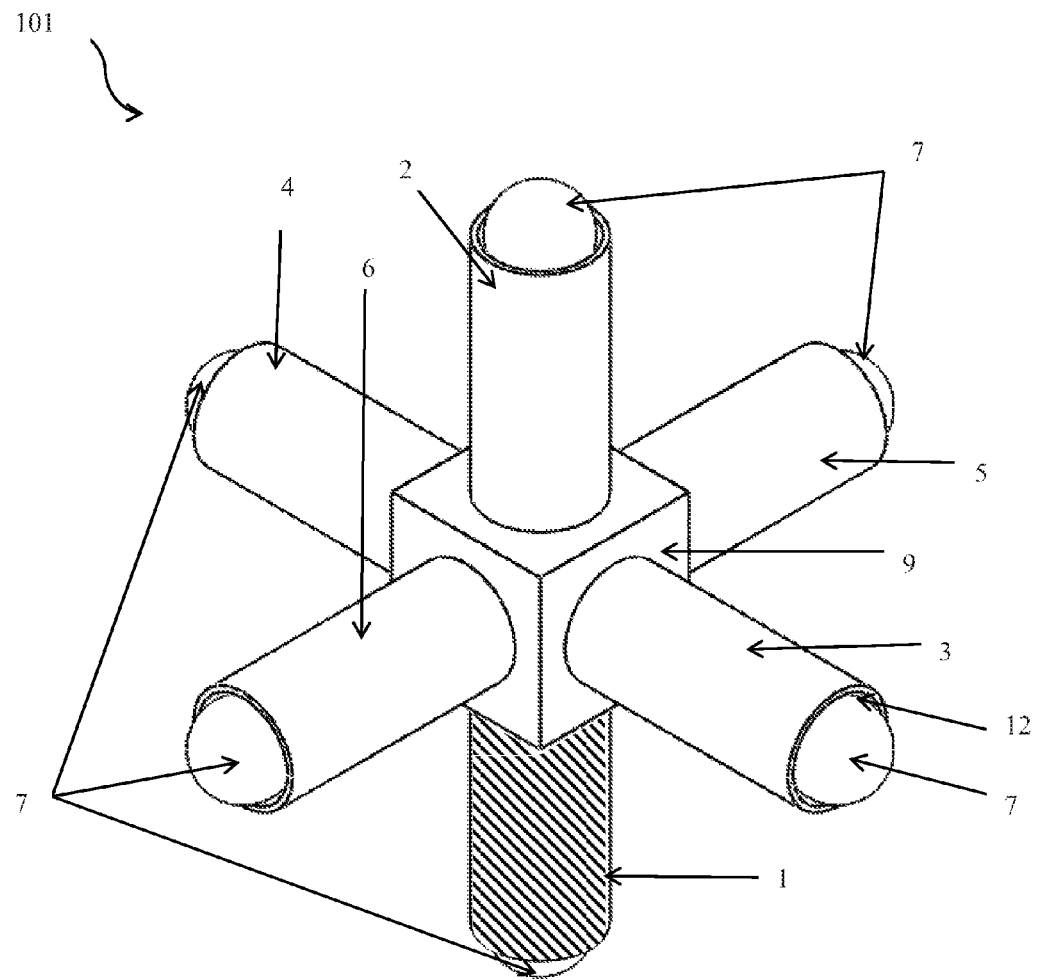
FIG. 3 illustrates perspective view of the rod structure of the orientation indicating device in accordance with an embodiment of the present disclosure.

FIG. 3 is another exemplary embodiment of the present disclosure which illustrates perspective view of the rod structure (101) of the orientation indicating device (100) comprising a central cube structure (9). The rod structure (101) is constructed in such a way that, one end of each of the rods (1, 2, 3, 4, 5 and 6) is fused to the center of at least one face of the cube structure (9). The weight of the rod (1) is heavier than that of the other rods (2, 3, 4, 5 and 6). By providing a heavier rod (1), the center of gravity of the rod structure (101) is always acting at the tip end of the heavier rod (1) which always points towards gravity.

Further, each of the plurality of rods (1, 2, 3, 4, 5 and 6) is provided with a provision (12) of hemi-spherical shape at their free ends. The provisions (12) are provided to accommodate at least one roller for free movement of the rod structure (101) within the enclosure (8) (best shown in FIG. 3). The rollers (7) are generally configured in spherical shape, and are placed in such a way that, a portion of the roller (7) resides in a provision (12), and the remaining portion of the roller (7) protrudes outside each of the rods (1, 2, 3, 4, 5 and 6). The rollers (7) are disposed in the provisions (12) such that the rollers (7) are free to rotate in any direction with respect to the force applied on the orientation indicating device (100). The rollers (7) are basically friction rollers which rotate according to the direction of force applied on the orientation indicating device (100). In an embodiment, the rollers (7) are selected from a group comprising but not limiting to ball bearings, roller bearings, specialized bearings and the like. Further, the diameter of the roller is smaller than the diameter of the provision (12) to facilitate free movement of the rollers. In addition, the rollers are placed in the provisions such that the center of each roller is equidistant from the center of the rod structure (101). Some of the materials that are used for the rollers (7) are at least one of Phenolic-resin balls, Plastic acetal, Chromium Chrome steel, ES1 stainless steel, Carbon chromium steel, Aluminium-Magnesium-Silicon alloys and the like.

Figure 4:
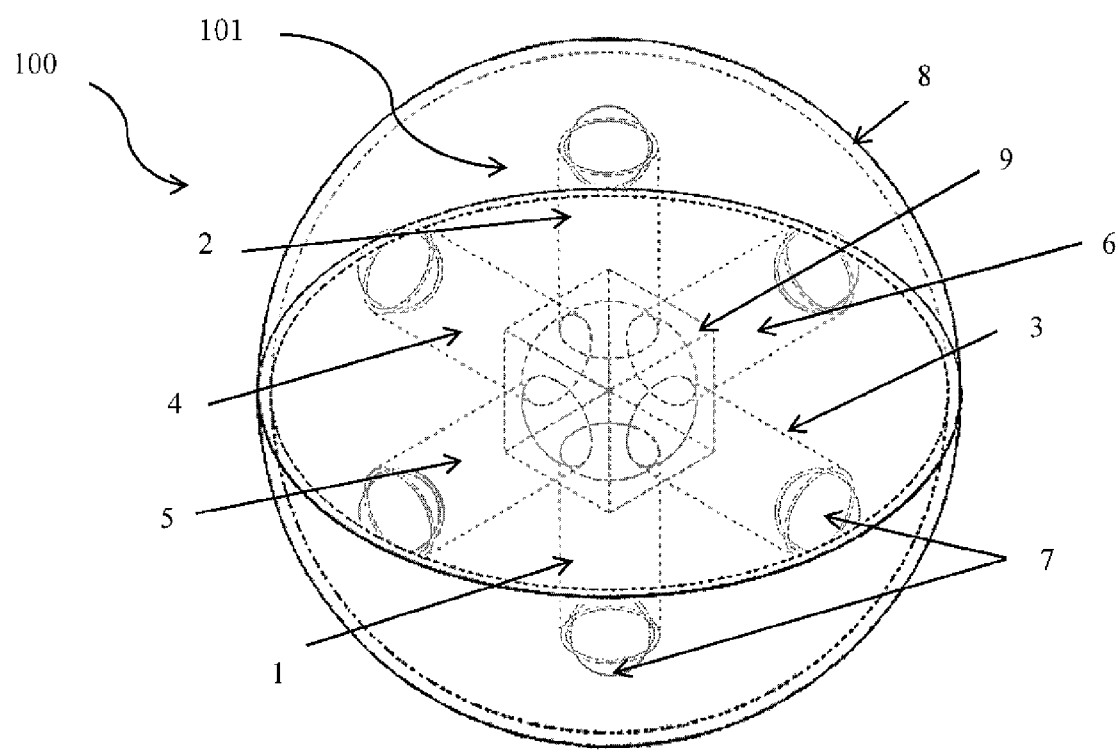
FIG. 4 illustrates perspective view of the orientation indicating device depicting rod structure of FIG. 3 configured inside an enclosure in accordance with an embodiment of the present disclosure.

FIG. 4 illustrates an exemplary embodiment depicting the perspective view of the orientation indicating device (100) of the second embodiment. A central cube structure (9) is provided at the center to which each of the rods (1, 2, 3, 4, 5 and 6) is fused to the center of at least one face of the cube structure (9) pointing at X, Y and Z axes both in positive and negative co-ordinates. The heavier rod (1) of the rod structure (101) always points towards gravity when the force is applied to the orientation indicating device (100). Further, at tip end of each of the rods (1, 2, 3, 4, 5 and 6) the roller may be provided. The rod structure (101) may be enclosed in an enclosure (8) and can freely rotate within the enclosure (8) on the application of directional force acting on the orientation indicating device (100).

Figure 5:
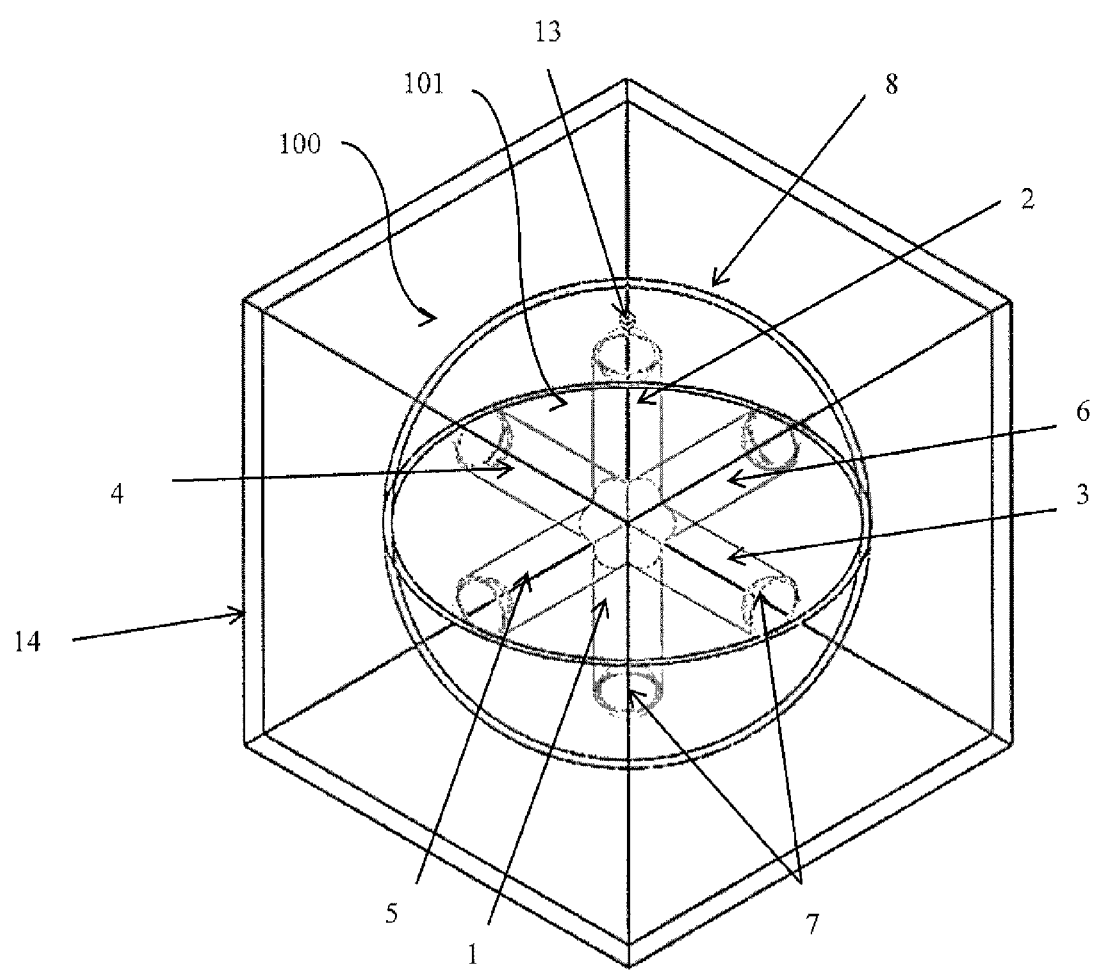
FIG. 5 illustrates perspective view of the orientation indicating device configured inside the housing in accordance with an embodiment of the present disclosure.

FIG. 5 is an exemplary embodiment of the present disclosure which illustrates perspective view of the orientation indicating device (100) configured inside a housing (14) for determining orientation of the object. The enclosure (8) consisting of a rod structure (101) with rods (1, 2, 3, 4, 5 and 6) pointing at X, Y and Z axes both in positive and negative co-ordinates. is fixed to an inner surface of the housing (14). In an embodiment, the enclosure (8) may be fixed to the inner surface of the housing (14) with the aid of a fixing arm (13) at one or more points. Alternatively, the enclosure (8) may be fixed to the housing (14) using any other method which is known in the art. The housing (14) in the present embodiment is a cuboid having equal dimensions. Moreover, the housing (14) is configured in a shape including but not limiting to circular, square, rectangular, triangular, trapezoidal, octagonal, or any other shape which is generally known in the art.

Figure 6:
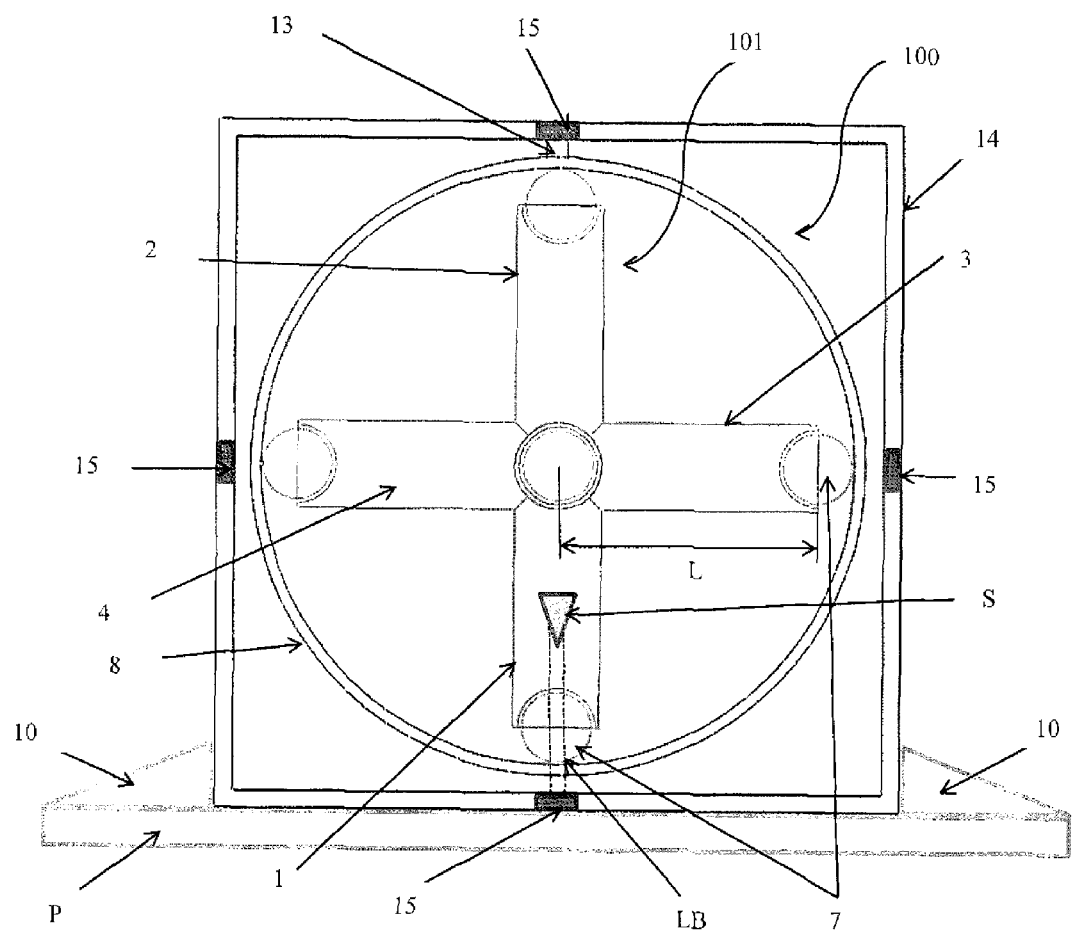
FIG. 6 illustrates front view of the orientation indicating device depicted in FIG. 5.
Figure 7:
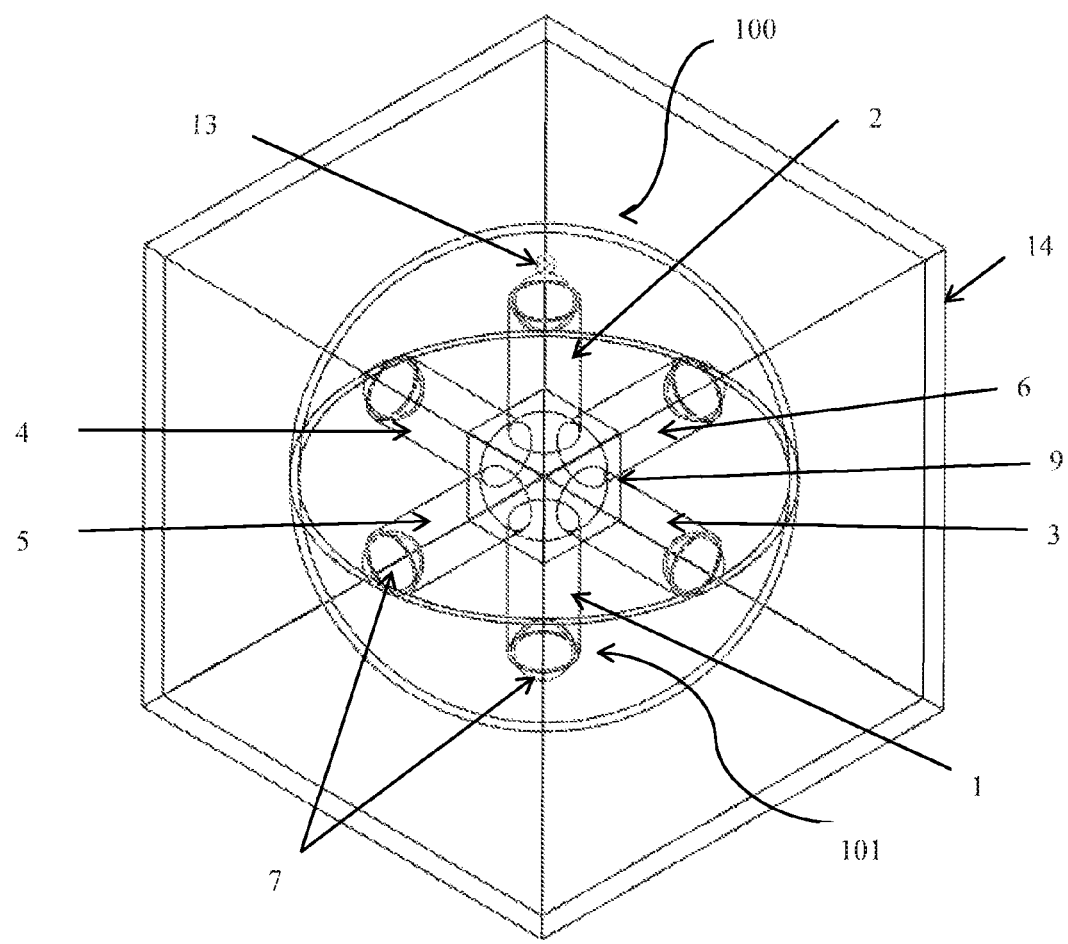
FIG. 7 illustrates perspective view of the orientation indicating device configured inside the housing in accordance with an embodiment of the present disclosure.
Figure 8:
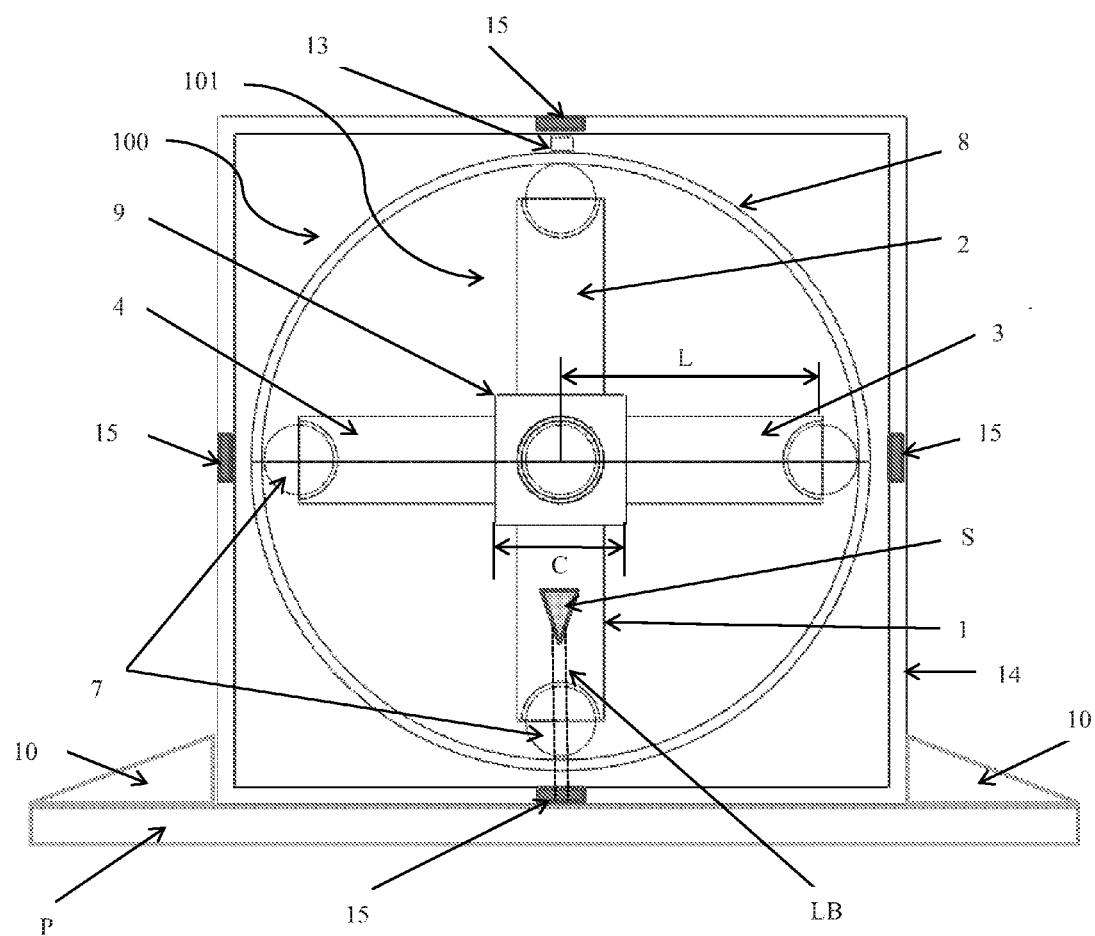
FIG. 8 illustrates front view of the orientation indicating device depicted in FIG. 7.

FIGS. 6 and 8 illustrates front views of the orientation indicating device (100) depicted in FIG. 5 and FIG. 7 respectively. The housing (14) is mounted on to a platform (P), the housing (14) is held in place by plurality of stoppers (10). Each face of the housing (14) is equipped with sensors (15) such as but not limiting to Charge-coupled devices CCD image sensor, optical sensors and Complementary metal-oxide-semiconductor (CMOS) sensor. The heavier arm (1) is equipped with a light source (S). The light source (S) is at least one of but not limiting to a laser. The light source (S) continuously emits light beam (LB) during the operation of the orientation indicating device (100). When the platform (P) is moved at an angle θ, the entire housing (14) displaces according to angle θ. The heavier arm (1) which is equipped with the light source (S) displaces in the direction of the gravitational pull. This deviation in angle θ with respect to the orientation of the heavier arm (1) can be used to determine the orientation of the platform (P). When the heavier arm (1) is displaced the light beam (LB) activates the corresponding sensor (15) based on the displacement of the heavier arm. For example, if the platform (P) is tilted at angle 90 degree in X-axis the heavier arm (1) activates the sensor (15) which corresponds to the 90 degree angle in X-axis thus determining the orientation.

FIG. 7 is an exemplary embodiment of the present disclosure which illustrates perspective view of the orientation indicating device (100) configured inside the housing (14) for determining the orientation of the object. The enclosure (8) consists of a rod structure (101) with rods (1, 2, 3, 4, 5 and 6) pointing at X, Y and Z axes bot in positive and negative co-ordinates. The rod structure (101) is constructed in such a way that, one end of each of the rods (1, 2, 3, 4, 5 and 6) is fused to the center of at least one face of the cube structure (9). In an embodiment of the present disclosure, the enclosure (8) may be fixed to an inner surface of the housing (14) with the aid of a fixing arm (13). The housing (14) in the present embodiment is a cuboid having equal dimensions.

Figure 9:
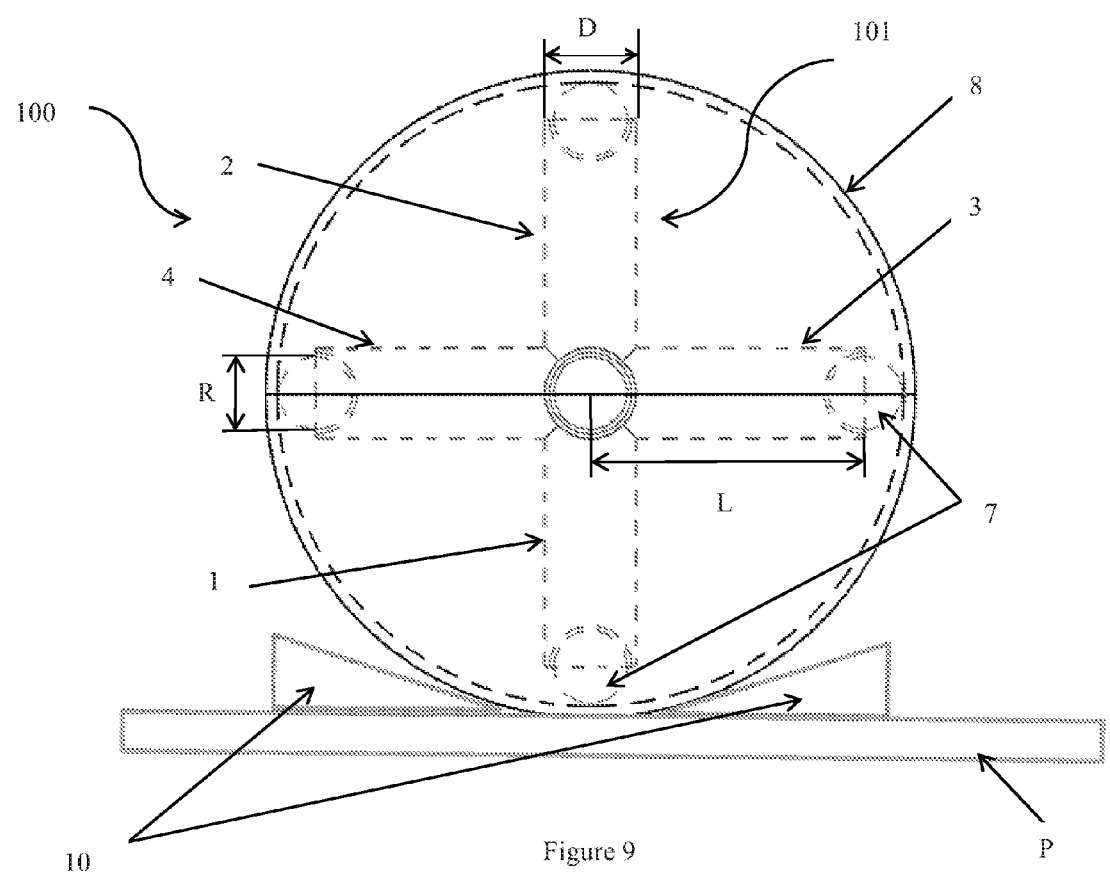
FIG. 9 illustrates front view of the orientation indicating device of the FIG. 2 fixed on a platform.
Figure 10:
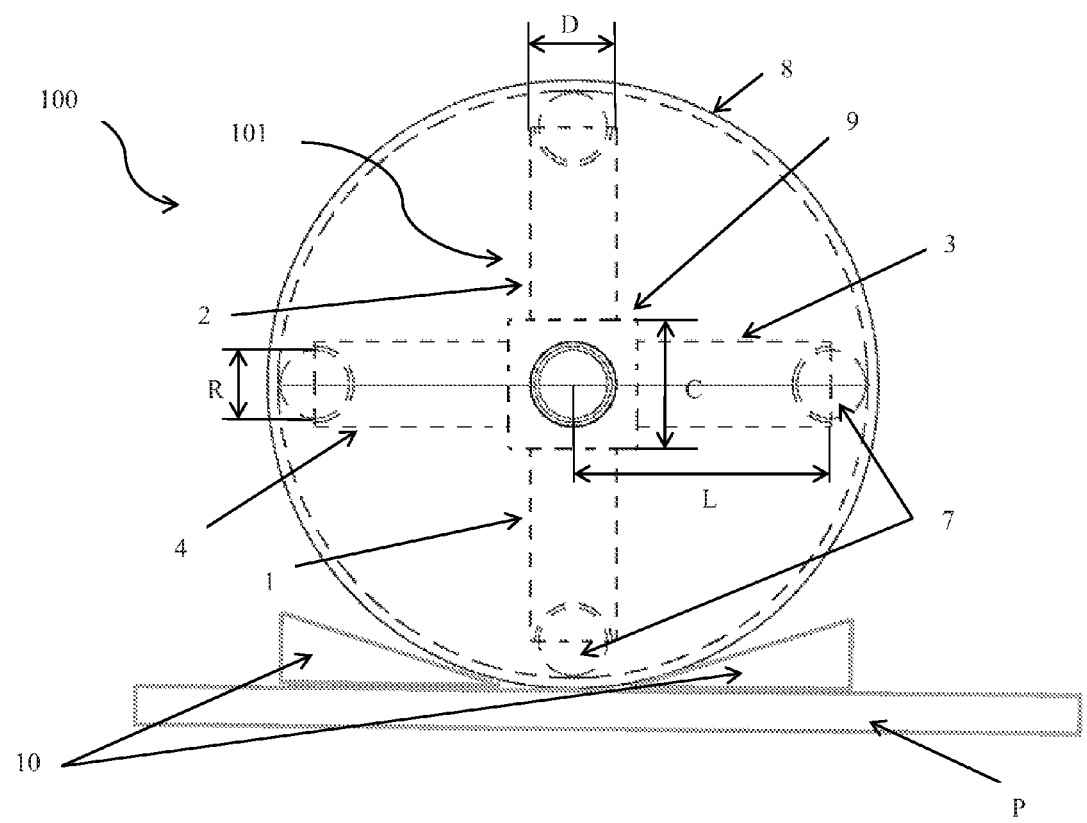
FIG. 10 illustrates front view of the orientation indicating device of FIG. 4 fixed on a platform in accordance with an embodiment of the present disclosure.

FIGS. 9 and 10 are an exemplary embodiment of the present disclosure which illustrates front view of the orientation indicating device (100) of first and second embodiments which is fixed on an object to determine the orientation. As an example FIG. 6 shows the assembly of orientation indicating device (100) onto a platform (P) for determining the orientation. The rod structure (101) along with the rollers (7) is installed within the enclosure (8) constituting the orientation indicating device (100). The entire orientation indication device (100) is firmly fixed onto a platform (P) for which the orientation has to be determined along the three mutually perpendicular axes (pitch, roll and yaw) X, Y, Z axes. Further, plurality of stoppers (10) may be provided on the platform (P) to firmly fix the orientation indicating device (100). The platform (P) may be inclined at an angle with respect to the horizon. Even if the enclosure (8) is inclined at an angle with respect to the platform (P), the rod structure (101) having the heavier rod (1) always points towards gravity. Based on the directional forces applied on the platform (P) the orientation indicating device (100) orients itself towards gravity due to the provision of heavier rod (1) in comparison with the other rods (2, 3, 4, 5 and 6). Thereby indicates the orientation of the object.

Figure 11A:
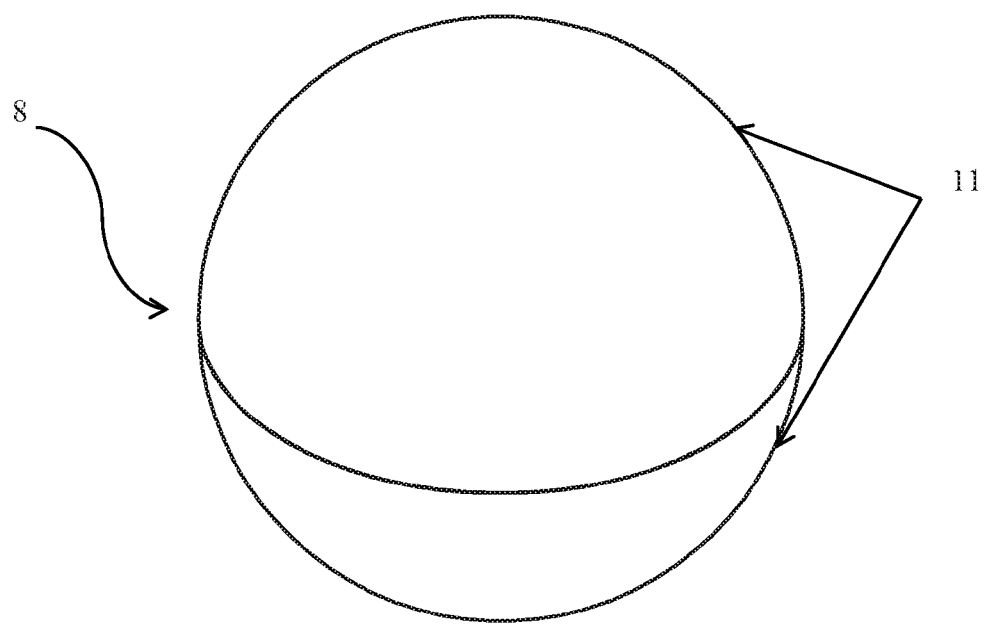
FIGS. 11a and 11b illustrates top and bottom perspective views of the enclosure in accordance with an embodiment of the present disclosure.
Figure 11B:
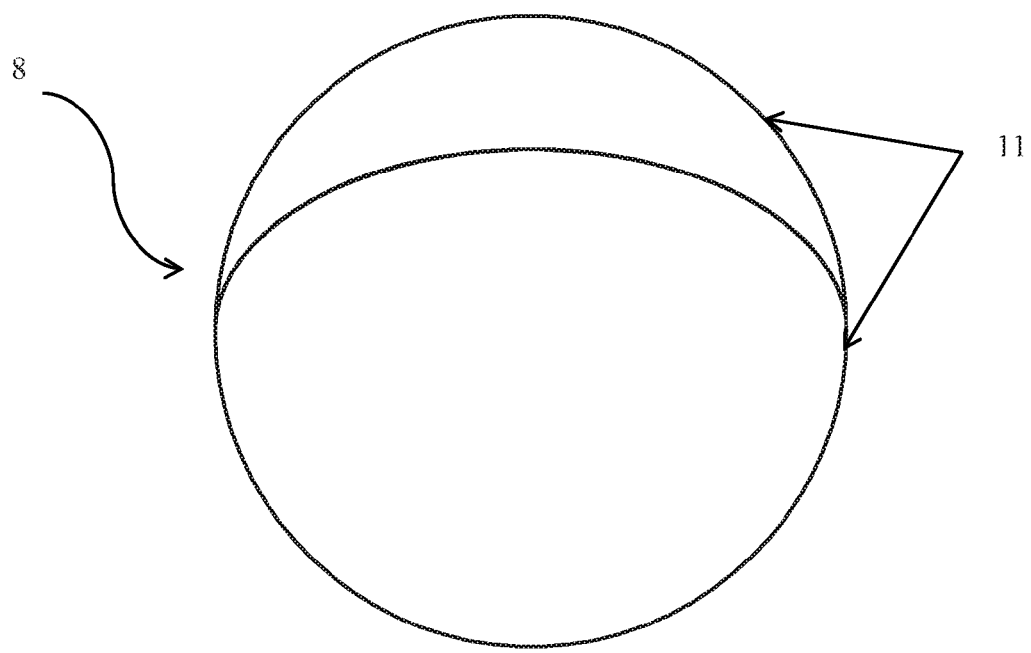

The rod structure (101) is fused to the center of at least one face of the cube structure (9) along with the rollers (7) is installed within the enclosure (8) constituting the orientation indicating device (100) of the second embodiment as illustrated in FIG. 8. The entire orientation indication device (100) is firmly fixed onto a platform (P) for which the orientation has to be determined along the three mutually perpendicular axes (pitch, roll and yaw) X, Y, Z axes. Further, plurality of stoppers (10) will be provided on the platform (P) to firmly fix the orientation indicating device (100). The platform (P) can be inclined at an angle with respect to the horizon. Even if the enclosure (8) is inclined at an angle with respect to the platform (P), the rod structure (101) having the heavier rod (1) always points towards gravity. Based on the directional forces applied on the platform (P) the orientation indicating device (100) orients itself towards gravity due to the provision of heavier rod (1) in comparison with the other rods (2, 3, 4, 5 and 6). Thereby indicates the orientation of the object. Also, provision of a cube structure (9) at the center of the rod structure (101) does not constitute imbalances in the forces FIGS. 11a and 11b are exemplary embodiments of the present disclosure which illustrates top and bottom perspective views of the enclosure (8) of the orientation indicating device (100). The enclosure (8) is generally formed in a spherical shape by joining two half shell members (11). The enclosure (8) is internally equipped with the rod structure (101) and this entire assembly can be fixed onto an object (P) [best shown in as shown in FIG. 5] for determining the orientation of the object about the three mutually perpendicular (pitch, roll and yaw) axes. In an embodiment of the present disclosure, the enclosure (8) is made of a material including but not limiting to translucent material so as to facilitate visual appearance of the rod structure to the user. This allows the use to determine the orientation of the heavier rod (1) which will always point towards gravity. In alternative embodiment, the enclosure may be formed of opaque material.

In an embodiment of the present disclosure, the two half shell members (11) are hemispherical in shape and are joined either permanently or removably to form a spherical shaped enclosure (8). In an embodiment, the permanent joining methods such as but not limiting to metal joining, and adhesive joining may be used to join the two half shell members (11). In alternative embodiment, the removable joining methods such as threaded joining, snap fit, and press fit can be used to join the two half shell members (11) to form an enclosure.

In an embodiment of the present disclosure, the orientation determination of a particular object can be determined by the orientation indicating device (100) provisioned with at least one or combination of the following but not limiting to analog markings, use of sensors or any other similar orientation measuring techniques which are known in the art.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| | |
|---|---|
| Orientation Indication Device | 100 |
| Rod structure | 101 |
| Rods | 1, 2, 3, 4, 5 and 6 |
| Rollers | 7 |
| Enclosure | 8 |
| Cube structure | 9 |
| Stoppers | 10 |
| Half shell member | 11 |
| Provision | 12 |
| Fixing arm | 13 |
| Housing | 14 |
| Sensors | 15 |
| Platform | P |
| Length of rod | L |
| Diameter of Rod | D |
| Cube structure dimension | C |
| Diameter of roller | R |
| Light source | S |
| Light beam | LB |
| Axis | A_A |

What is claimed is:

1. An orientation indicating device comprising:
    an enclosure; and
    a plurality of rods fixed together such that at least one end of each of the rods is fixed together with at least one end of one of the other rods so that the plurality of rods form a rod structure, wherein
        the rod structure is rotatably mounted inside the enclosure,
        at least one roller is provisioned in-between an inner surface of the enclosure and a free end of each of the plurality of rods of the rod structure,
        at least one rod of the plurality of rods is configured to be heavier than the other rods of the rod structure, and
        said heavier rod is adapted to point towards gravity.

2. The orientation indicating device as claimed in claim 1, wherein each of the plurality of rods are configured such that, when the at least one roller is provisioned within the respective rod, the maximum distance that the center of the at least one roller can be positioned within the free end of the respective rod is equidistant from the center of the rod structure for each of the rods.

3. The orientation indicating device as claimed in claim 1, wherein each of the plurality of rods comprises a provision at a free end, which is the end opposite the end that is fixed together, to accommodate the at least one roller.

4. The orientation indicating device as claimed in claim 3, wherein the shape of the provision is a hemi-sphere shape.

5. The orientation indicating device as claimed in claim 1, wherein the shape of the at least one roller is spherical.

6. The orientation indicating device as claimed in claim 1, wherein the shape of the enclosure is spherical.

7. The orientation indicating device as claimed in claim 1, wherein the enclosure is translucent.

8. The orientation indicating device as claimed in claim 1, wherein the heavier rod is visually differentiable from the other rods of the rod structure.

9. The orientation indicating device as claimed in claim 1, wherein the at least one roller is at least one of: ball bearing, roller bearings, journal bearings, plain bearings, acrylic bearings, Polyvinyl chloride (PVC) bearings, and synthetic material bearings.

10. The orientation indicating device as claimed in claim 1 wherein, the enclosure is configured within a housing.

11. The orientation indicating device as claimed in claim 1, wherein the heavier rod is configured with a light source.

12. The orientation indicating device as claimed in claim 11, further comprising a plurality of sensors, wherein the light source is configured to emit light onto a corresponding sensor of the plurality of sensors upon displacement of the heavier arm due to gravity.

13. The orientation indicating device as claimed in claim 1, wherein each of the plurality of rods forms a substantially perpendicular joint with a subsequent rod, and is substantially parallel to the rod which is in a same axis.

14. An orientation indicating device comprising:
an enclosure;
a plurality of rods fixed together such that at least one end of each of the rods is fixed together with at least one end of one of the other rods so that the plurality of rods form a rod structure; and
an orientation determining means that determines an indication of orientation of a platform to which the orientation indicating device is fixed onto, wherein the rod structure is rotatably mounted inside the enclosure,
at least one roller is provisioned in-between an inner surface of the enclosure and a free end of each of the plurality of rods of the rod structure,
at least one rod of the plurality of rods is configured to be heavier than the other rods of the rod structure, and
said heavier rod is adapted to point towards gravity.

15. The orientation indicating device as claimed in claim 14, wherein the orientation determination means is a plurality sensors provided on a housing that encloses the enclosure.

16. The orientation indicating device as claimed in claim 15, wherein each face of the housing includes at least one of the sensors attached thereto.

17. The orientation indicating device as claimed in claim 14, wherein the indication of orientation is an indication of orientation about three mutually perpendicular axes.

18. The orientation indicating device as claimed in claim 17, wherein the three mutually perpendicular axes correspond to pitch, roll and yaw axes.

19. An orientation indicating device comprising:
a plurality of rods fixed together such that at least one end of each of the rods is fixed together with at least one end of one of the other rods so that the plurality of rods form a rod structure;
an enclosure that has a spherical shape and that encloses the rod structure; and
an orientation determining means that determines an indication of orientation of a platform to which the orientation indicating device is fixed onto.

\* \* \* \* \*